United States Patent

[11] 3,541,938

[72] Inventor Donald M. Harvey
 Rochester, New York
[21] Appl. No. 695,769
[22] Filed Jan. 4, 1968
[45] Patented Nov. 24, 1970
[73] Assignee Eastman Kodak Company
 Rochester, New York
 a corporation of New Jersey

[54] DEVICE FOR EXPOSING AND PROCESSING RADIATION SENSITIVE UNITS
14 Claims, 13 Drawing Figs.
[52] U.S. Cl..................................................... 95/13, 95/26
[51] Int. Cl.............................................G03b 17/52
[50] Field of Search........................................... 95/13, 26, 12

[56] References Cited
UNITED STATES PATENTS
2,602,386 7/1952 Brigham........................ 95/26
2,854,903 10/1958 Land............................. 95/12X Primary Examiner—John M. Horan
Attorneys—Robert W. Hampton and Gary D. Fields ABSTRACT: A device such as a camera, is provided in which a radiation-sensitive unit, such as a slide transparency unit can be transported from a storage chamber to another chamber for exposure and processing each unit including a radiation-sensitive element and at least one rupturable pod containing a processing agent. The preferred embodiment illustrates a camera suitable for exposing and processing a slide transparency unit, each unit including a pair of pods, adjacent to the transparency, containing nonviscous processing agents. After the transparency has been exposed, the two pods are sequentially ruptured and the processing agents contained therein are forced across the transparency by a pair of pistons in, or adjacent to, the camera exposure chamber.

Patented Nov. 24, 1970

DONALD M. HARVEY
INVENTOR.

BY *Gary D. Fields*

*Robert W. Hampton*

ATTORNEYS

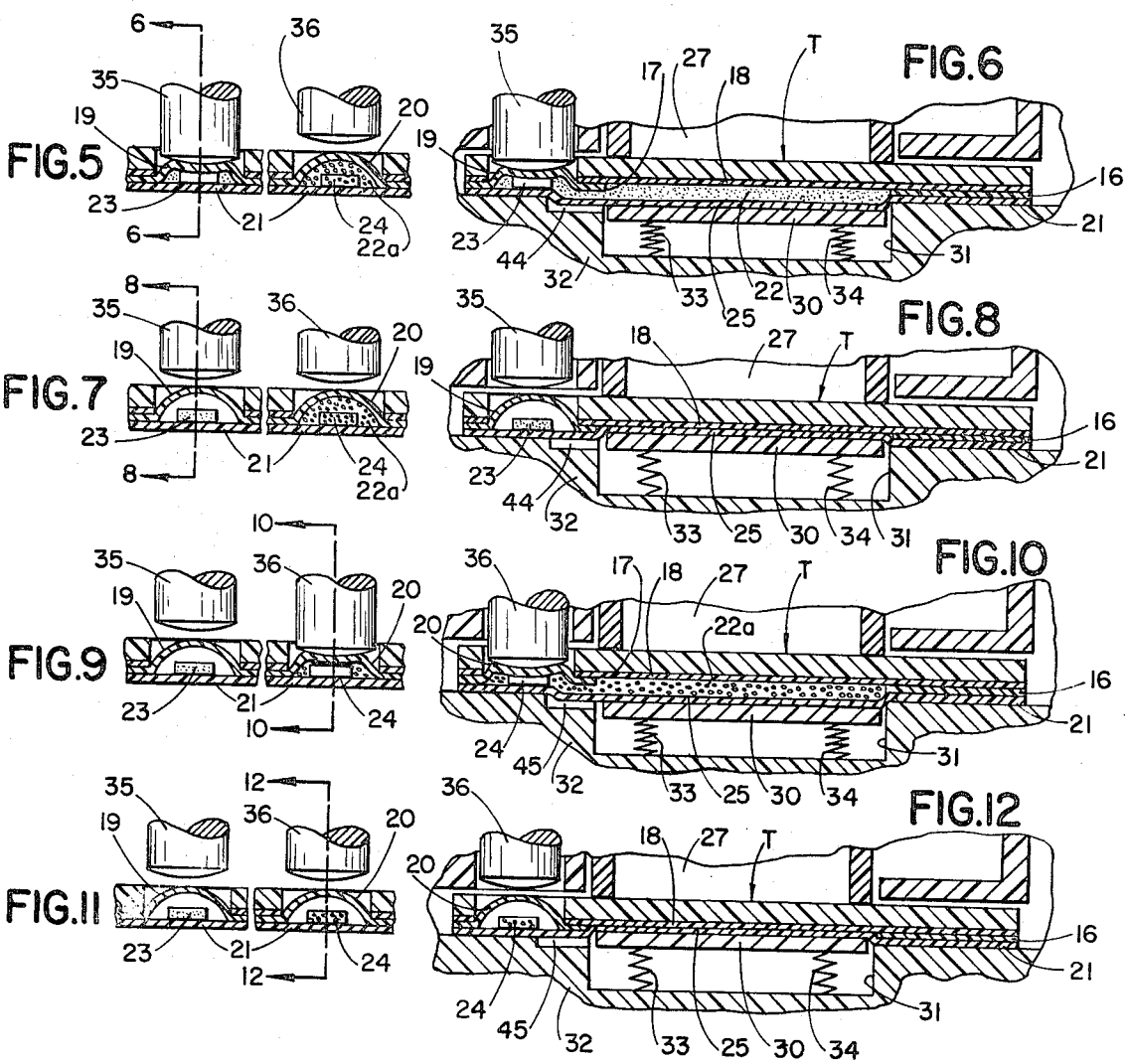
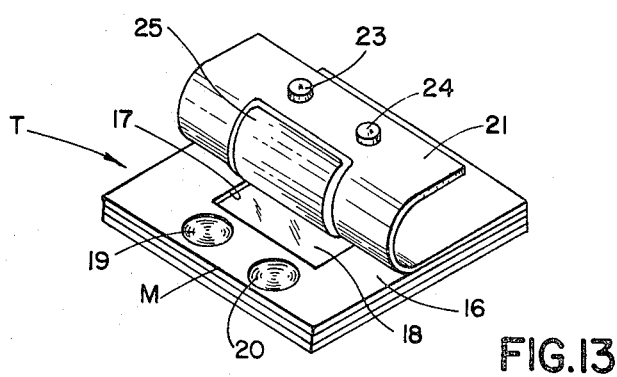
FIG.13

3,541,938

DEVICE FOR EXPOSING AND PROCESSING RADIATION SENSITIVE UNITS

CROSS-REFERENCES TO RELATED APPLICATIONS

Reference is made to the following commonly assigned, copending U.S. Pat. applications: Ser. No. 675,597, entitled "Camera and Method for Exposing and Developing Slide Transparency Units", filed Oct. 16, 1967 in the name of Hubert Nerwin; Ser. No. 685,687, entitled "Cartridge for Dispensing and Storing Slide Transparency Units", filed Nov. 24, 1967 in the name of Henry J. Bartnick et al.; Ser. No. 685,618, entitled "Cartridge for Dispensing Slide Transparency Units" filed Nov. 24, 1967 in the name of Leonard F. Kamp; and Ser. No. 695,768, entitled "Slide Transparency Unit for In-Camera Processing", filed on even date herewith in the name of Donald M. Harvey.

BACKGROUND OF THE INVENTION

1. Field of the Invention

This invention relates generally to a device suitable for expressing and processing a radiation-sensitive unit, and particularly, to a camera in which slide transparency units can be exposed and processed.

2. Description of the Prior Art

A number of techniques have been developed whereby photosensitive material can be exposed within a camera and then developed and transferred to an image-receiving sheet to provide a positive print. The development of cameras which can process slide transparencies, however, has not been undertaken to any great extent. U.S. Pat. No. 3,225,670 to M. Friedman et al.; is directed to a 35 mm. system in which separate slide transparency units are loaded in an exposure chamber of a camera with a leader extending from each unit through a processing chamber and out of the camera. After exposure, each slide transparency unit is successively pulled into the processing chamber causing a processing fluid, contained in a single rupturable pod, to be spread across the transparency. After an appropriate development period, the transparency is pulled from the camera for viewing. Such a camera has the potential disadvantage that the wrong leader may be pulled or that more than one leader may be pulled at the same time, jamming the slide transparency units in the camera mechanism. Furthermore, no means is provided in such a system for utilizing more than one processing agent, use of only one processing agent posing the added disadvantage of increasing the complexity of the photographic chemistry involved. The present invention provides a device that is suitable for exposing and processing a radiation-sensitive unit of the type including a radiation-sensitive element and a rupturable pod which contains a processing agent exudable from the pod onto the element, when the pod is ruptured, to process the element after the element has been exposed. The device comprises a storage chamber for storing an unexposed unit therein, and exposure chamber for exposing a unit received from the storage chamber, a passageway interconnecting the two chambers for allowing movement of an unexposed unit from the storage chamber to the exposure chamber, and means movable transversely to the movement of a unit through the passageway and engageable with the pod of a unit after exposure for rupturing the pod and thereby exuding the processing agent therefrom onto the exposed element.

In the preferred embodiment illustrated below, the device is a photographic camera adapted to expose and process a plurality of slide transparency units. By means of a slide mechanism in the camera, unexposed transparency units are transported sequentially from a storage chamber through a passageway into a exposure-and-processing chamber. After a transparency unit has been exposed, a piston assembly, having two pistons, is utilized to sequentially rupture a pair of pods on the unit and cause a nonviscous agent to be exuded from each pod onto the exposed processing. With such an arrangement the first pod to be ruptured could contain a developing agent, and the second pod could contain another developing agent, a fixing agent, or a bleaching agent. Further operation of the slide mechanism to bring a succeeding unexposed transparency unit into the exposure and processing chamber causes the exposed and processed unit to be ejected from the camera.

It should be understood that the term "transparency" as used herein, refers to the film exposed area, whether in its unexposed, exposed, or processed condition.

Additional novel features of this invention will become apparent in the description of the preferred embodiment presented below in conjunction with the accompanying drawings.

BRIEF DESCRIPTION OF THE DRAWINGS

FIG. 5 is a fragmentary vertical section through the piston assembly showing the two pistons positioned so that the first piston is in its pod rupturing position upon the first pod on the transparency unit;

FIG. 6 is a fragmentary, vertical section, taken along line 6-6 of FIG. 5, showing the first processing agent, after its ejection from the first pod as it is held under pressure across the transparency;

FIG. 7 is a fragmentary, vertical section, through the piston assembly similar to FIG. 5 but showing both pistons in their raised positions;

FIG. 8 is a fragmentary, vertical section, taken along line 8-8 of FIG. 7, showing the first piston in its raised position above the first pod so that any unabsorbed first processing agent on the transparency can be returned to the first pod by the pressure pad;

FIG. 9 is a fragmentary vertical section, similar to FIGS. 5 and 7 but showing the second piston in its pod rupturing position upon the second pod on the transparency unit;

FIG. 10 is a fragmentary, vertical section, taken along line 10-10 of FIG. 9, showing the second processing agent, after its ejection from the second pod, as it is under pressure across the transparency;

FIG. 11 is a fragmentary, vertical section, through the piston assembly similar to FIGS. 5, 7, and 9 but showing both pistons in their raised position;

FIG. 12 is a fragmentary, vertical section, taken along line 12-12 of FIG. 11, showing the second piston in its raised position above the second pod so that any unabsorbed second processing agent on the transparency can be returned to the second pod by the pressure pad; and FIG. 13 is a perspective view of a transparency unit, which could be utilized in a camera constructed in accordance with this invention, showing a strippable cover sheet partly removed, after the transparency has been exposed and processed, in order to provide a finished transparency unit ready for viewing.

DESCRIPTION OF THE PREFERRED EMBODIMENT

Figure 1:
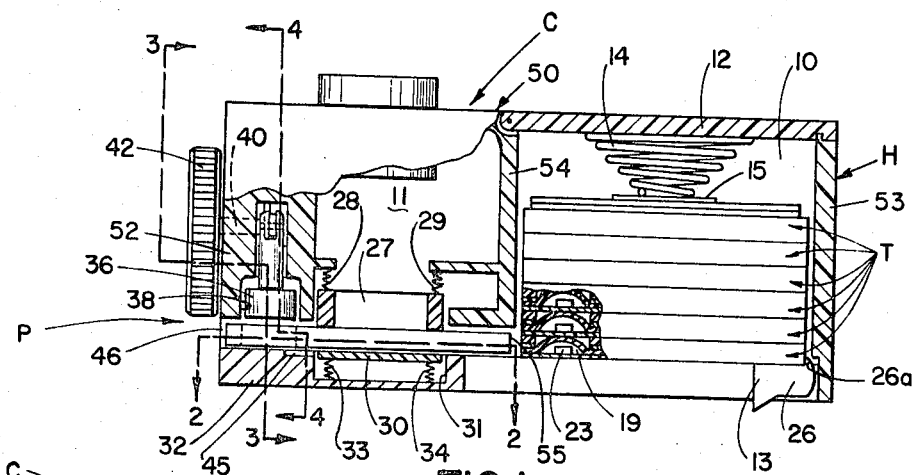
FIG. 1 is a longitudinal section through a camera constructed in accordance with this invention, showing a slide transparency unit in the camera exposure chamber.

In accordance with this invention, a camera C is provided in which a transparency unit can be processed immediately after exposure As shown in FIG. 1, camera C comprises a housing H having a pair of spaced sidewalls 50 and 32 interconnected by a pair of spaced end walls 52 and 53, with a center wall 54 extending from sidewall 50 toward sidewall 32 to divide housing H into a storage chamber 10 and an adjacent exposure chamber 11. The end of center wall 54 extending toward sidewall 32 terminates short of sidewall 32 to provide a passageway 55 through which a reciprocative slide mechanism 13 can transport a slide transparency unit T from storage chamber 10 into exposure chamber 11. For convenience chamber 10 is provided with a door 12 for receiving a plurality of slide transparency units T, which are urged toward slide mechanism 13 by a spring 14 bearing against a plate 15. Of course, the slide transparency units could be mounted in a suitable magazine or other device for supplying them to the camera, if desired.

As best seen in FIG. 13, each transparency unit T includes a generally rectangular mount M having a planar surface 16 and a central opening 17, across which a transparency 18 extends. A pair of rupturable blisters or pods 19 and 20 partially by depressions in mount M, as shown, are closed in a covering fashion, by a strippable sheet 21 overlying planar surface 16 and transparency 18. As described below, when pods 19 and 20 are ruptured, processing agents 22 and 22a contained therein, respectively which agents may be nonviscous fluids, will be spread across transparency 18 within a space formed between transparency 18 and strippable sheet 21, as more fully explained below. Advantageously, pods 19 and 20 are provided with absorbent material, such as sponges 23 and 24, respectively, which can absorb any unused processing agent, as described below. Strippable sheet 21 is advantageously provided with a depressed portion 25 to limit the space to be occupied by each processing agent the processing of transparency 18.

Reciprocative slide mechanism 13 is provided with a body 26 having a lip or finger 26a at one end for engaging an edge of a transparency unit in order to transport the engaged unit from storage chamber 10, through passageway 55, engaged unit, slide 13 is pushed to the left, as viewed in FIG. 1. The transported unit is then held against a generally rectangular, hollow abutment 27, which is biased toward the unit by resilient means such as springs 28 and 29 attached to housing H, by a resiliently urged pressure plate or pod 30 that is received in a recess 31 in camera wall 32 and held against the unit by resilient means such as springs 33 and 34 attached to wall 32. For convenience as best seen in FIGS. 6, 8, 10, and 12, pressure pad 30 is dimensioned to fit within the dimensions of opening 17 in mount M in order, to facilitate an even distribution of each processing agent across transparency 18, as described below.

Figure 3:
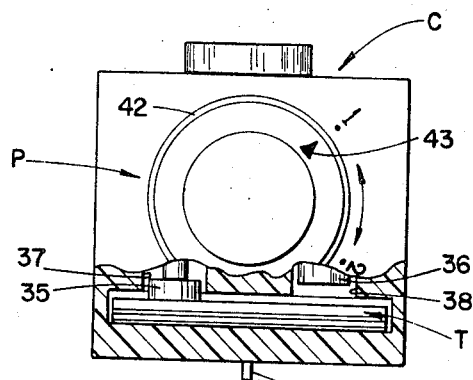
FIG. 3 is an offset vertical section, taken along line 3-3 of FIG. 1, illustrating the operation of the piston assembly.
Figure 4:
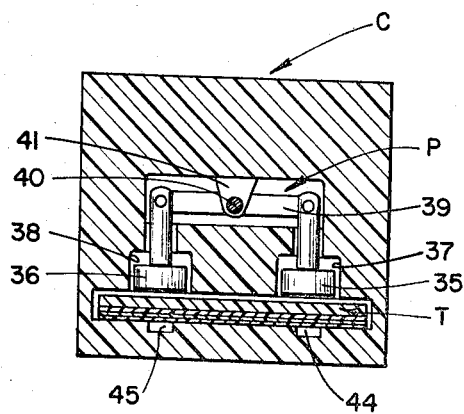
FIG. 4 is an offset vertical section, taken along line 4-4 of FIG. 1, showing further details of the piston assembly.

A piston assembly P is provided within camera C, as best seen in FIGS. 1, 3, and 4, which includes a pair of spaced pistons 35 and 36 that are mounted for reciprocative movement within recesses 37 and 38, respectively. Pistons 35 and 36 are pivotally connected, at their upper ends, to the opposite ends of an arm 39 which, in turn, is pivotally mounted, at its center, on a shaft 40 extending through a bracket 41 on housing H. Shaft 40 extends through wall 52 and has an operating knob 42 attached to its outside end for rotating shaft 40 and arm 39 in either direction so as to cause pistons 35 and 36 to move up or down in a reciprocative fashion. Advantageously, as seen in FIG. 3, the outside surface of wall 52 is provided with suitable indicia, such as the numerals 1 and 2, which in cooperation with a pointer 43 on knob 42, indicate the positions of the two pistons.

Figure 2:
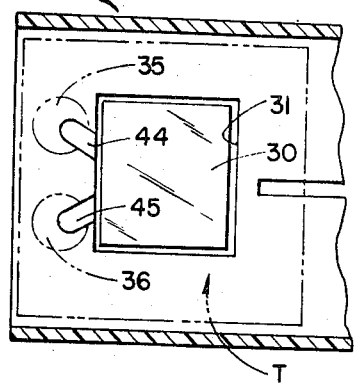
FIG. 2 is a fragmentary, horizontal section, taken along line 2-2 of FIG. 1, showing the construction of the pressure pad and related structure.

After exposure of a transparency unit T, knob 42 is rotated so that pointer 43 is aligned with numeral 1, thereby causing piston 35 to be forced downward against pod 19, as shown in FIGS. 5 and 6, thereby causing pod 19 to be ruptured. To ensure that pod 19 ruptures at the seal between pod 19 and the exposed area of transparency 18, a relief or depression 44 is provided in wall 32, as seen in FIG. 2, 4, and 6. Thus processing agent 22 is exuded from pod 19 under pressure into the space thereby formed between transparency 18 and sheet 21, as shown in FIG. 6, and is maintained under pressure by pressure pod 30 to ensure that the processing agent is distributed over the exposed area of transparency 18. A firm contact between pressure pad 30 and transparency T is ensured by the biasing influence of springs 28 and 29 upon abutment 27, springs 28 and 29 being stronger than springs 33 and 34 acting on pressure pad 30. After a suitable processing time has elapsed, knob 42 is rotated so that pointer 43 becomes alined with numeral 2. During this rotation, piston 35 will be raised to the position shown in FIGS. 7 and 8, and pressure pad 30, under the influence of springs 33 and 34, will force any unabsorbed or unused processing agent 22 back into pod 19, where it will be absorbed by sponge 23. As rotation of knob 42 continues toward the alinement of pointer 43 with numeral 2, piston 36 will be lowered, finally causing pod 20 to be ruptured at relief or depression 45 provided in wall 32, shown in FIGS. 2, 4, and 10. Thus, the second processing agent 22a in pod 20 will be forced from pod 20 under pressure into the space thereby formed between transparency 18 and sheet 21, as shown in FIG. 10. Knob 42 may then be rotated in the opposite direction to an intermediate position so that both pistons are in their raised positions, shown in FIG. 11, so that pressure pad 30 can force any unused or unabsorbed processing agent 22a back into pod 20, where it will be absorbed by sponge 24. Next, slide 13 can be moved to the right so that finger 26a will engage another unexposed transparency unit T. Movement to the left, then, will cause the exposed and processed transparency unit in the exposure chamber to be pushed by the succeeding, unexposed unit out of the camera through a slit 46 in wall 52. After the exposed and processed unit has been thus removed, sheet 21, along with sponges 23 and 24, can be stripped from the unit as shown in FIG. 13. The development process described herein is claimed in commonly assigned U.S. Pat. No. 3,354,674, entitled "Process and Product for Image Transfer Photography" and issued on Nov. 14, 1947.

From the foregoing description, it can be seen that the novel features of this invention are significant. A camera has been provided for exposing and processing slide transparency units, each unit preferably having two pods containing processing agents, the pods being sequentially ruptured by a two-piston assembly in the camera. The piston assembly causes each processing agent to be exuded, under pressure, from its pod into a space between the transparency and a strippable cover sheet overlying the transparency, pressure on the exuded agent then being maintained by a spring-urged pressure pad to ensure that all of the exposed area of the transparency receive the processing agent. After a suitable time for processing by first agent has elapsed, the first piston is raised above the ruptured first pod so that the pressure pad can then force any excess first processing agent back into the pod. The first procedure is then repeated for the second pod, which causes the second processing agent, which could be a bleaching agent, to be spread across the transparency unit. After the second piston has been raised above the ruptured second pod, and any excess second agent returned to that pod, the processed transparency unit can be ejected from the camera by operating a reciprocative slide mechanism, which moves the next unexposed transparency unit into its exposure position and thereby pushes the processed unit out of the camera.

The invention has been described in detail with particular reference to a preferred embodiment thereof, but it will be understood that variations and modifications can be effected within the spirit and scope of the invention.

I claim:

1. A camera for exposing and effecting the processing of radiation-sensitive units, each unit including a mount having a central opening, a radiation-sensitive element on the mount extending across the central opening, and a rupturable pod containing a processing agent on the mount adjacent to the central opening, said camera comprising:

means defining a position for exposing a radiation-sensitive unit;

means defining a position for storing a plurality of unexposed radiation-sensitive units:

means for effecting movement of an unexposed unit from said storage position to said exposure position;

pod rupturing means in said camera, movable transversely toward the direction of movement of the radiation-sensitive units for engaging the pod of an exposed radiation-sensitive unit for rupturing the engaged pod so that the processing agent contained therein can be spread across the exposed radiation-sensitive element; and means for moving said pod rupturing means toward said direction of movement of the radiation-sensitive units to engage and rupture the pod.

2. A camera as claimed in claim 1 wherein said pod rupturing means includes a piston mounted in said camera for reciprocative movement toward and away from the pod of an exposed radiation-sensitive element unit in said exposure chamber.

3. A camera for exposing and processing radiation-sensitive units, each unit including a mount having a central opening, a radiation-sensitive element on the mount extending across the central opening, and first and second rupturable pods containing first and second processing agents, respectively, both pods being supported on the mount adjacent to and substantially the same distance from the central opening, said camera comprising:

means defining an exposure chamber for exposing a radiation-sensitive unit received therein;

means defining a storage chamber, adjacent to said exposure chamber, for storing a plurality of unexposed radiation-sensitive units received therein;

means defining a passageway interconnecting said chambers, through which passageway each of the radiation-sensitive units can be moved in a direction from said storage chamber to said exposure chamber; and first and second pistons mounted in said camera for reciprocative movement transverse to the direction of movement of the radiation-sensitive units through said passageway, and sequentially engageable with the first and second pods, respectively, of an exposed radiation-sensitive unit in said exposure chamber, to sequentially rupture the engaged pods so that the first and second processing agents contained therein can be sequentially spread across the exposed radiation-sensitive element.

4. A camera as claimed in claim 3 further including:

an arm, having two ends, pivotally mounted on said camera about an axis intermediate said ends, each of said ends being connected to one of said pistons; and operating means coupled to said arm for reciprocatively rotating said arm to sequentially engage said pistons with the pods of an exposed radiation-sensitive unit in said exposure chamber.

5. A camera as claimed in claim 4 wherein said means defining said exposure chamber includes a wall having an opening therein, and said operating means includes:

a shaft, having first and second ends, rotatably mounted in said camera along said axis, said first end being connected to said arm, said second end extending through said opening in said wall; and a knob connected to said second end for reciprocatively rotating said shaft and said arm to effectuate reciprocative movement of said pistons.

6. A camera for exposing and processing radiation-sensitive units, each unit including a mount having a planar surface and a central opening, a radiation-sensitive element on the mount extending across the central opening and spaced from the planar surface, a rupturable pod containing a processing agent on the mount adjacent to the central opening, and a strippable cover sheet on the mount overlying the planar surface and the central opening, said camera comprising:

means defining an exposure chamber for exposing a radiation-sensitive unit received therein;

means defining a storage chamber, adjacent to said exposure chamber, for storing a plurality of unexposed radiation-sensitive units received therein;

means defining a passageway interconnecting said chambers, through which passageway each of the radiation-sensitive units can be moved in a direction from said storage chamber to said exposure chamber;

means defining a slit in said means defining said exposure chamber spaced from said passageway, through which slit an exposed radiation-sensitive unit can be pushed by a succeeding unexposed radiation-sensitive unit as the succeeding unit is moved from said storage chamber into said exposure chamber;

pod rupturing means in said exposure chamber adjacent to said slit, movable transversely to the direction of movement of the radiation-sensitive units through said passageway, and engageable with the pod of an exposed radiation-sensitive unit in said exposure chamber, for rupturing the engaged pod so that the processing agent will thereby be exuded from the ruptured pod onto the exposed radiation-sensitive element between the radiation-sensitive element and the cover sheet; and a resiliently urged pressure pad in said exposure chamber engageable with the cover sheet of an exposed radiation-sensitive unit in said exposure chamber for pressurizing the exuded processing agent between the exposed radiation-sensitive element and the cover sheet so as to help spread the exuded processing agent across the radiation-sensitive element and force any excess processing agent back into the ruptured pod.

7. A camera as claimed in claim 6 further including a resiliently mounted abutment in said exposure chamber spaced from said pressure pad so that radiation-sensitive unit is receivable between said abutment and said pressure pad, said abutment being engageable with the mount of a radiation-sensitive unit so received to support the received radiation-sensitive unit against said pressure pad.

8. A camera as claim in claim 6 wherein said means defining said exposure chamber includes a wall portion adjacent to said pressure pad having a depression therein extending from the location of the pod of a radiation-sensitive unit received in said exposure chamber to said pressure pad to facilitate the flow of the processing agent exuded from the pod, when ruptured, onto the radiation-sensitive element of the received unit.

9. A camera for exposing and processing radiation-sensitive units, each unit including a mount having a planar surface and a central opening, a radiation-sensitive element on the mount extending across the central opening and spaced from the planar surface, first and second rupturable pods containing first and second processing agents, respectively, both pods being supported on the mount adjacent to and substantially the same distance from the central opening, and a strippable cover sheet on the mount overlying the planar surface and the central opening, said camera comprising:

means defining an exposure chamber for exposing a radiation-sensitive unit received therein;

means defining a storage chamber, adjacent to said exposure chamber, for storing a plurality of unexposed radiation-sensitive units received therein;

means defining a passageway interconnecting said chambers, through which passageway each of the stored radiation-sensitive units can be moved in a direction from said storage chamber to said exposure chamber;

means defining a slit in said means defining said exposure chamber spaced from said passageway, through which slit an exposed radiation-sensitive unit can be pushed by a succeeding unexposed radiation-sensitive unit as the succeeding unit is moved from said storage chamber into said exposure chamber;

first and second pistons mounted in said exposure chamber adjacent to said slit for reciprocative movement transverse to the direction of movement of an exposed radiation-sensitive unit through said slit;

an arm, having two ends, pivotally mounted in said camera about an axis intermediate said ends, each of said ends being connected to one of said first and second pistons;

a shaft, having first and second ends, rotatably mounted in said camera along said axis, said first end being connected to said arm, said second end extending through said means defining said exposure chamber to a point outside said camera;

a knob connected to said second end of said shaft for reciprocatively rotating said shaft and said arm to effectuate reciprocative movement of said first and second pistons for sequential engagement of said first and second pistons with the first and second pods, respectively, of an exposed radiation-sensitive unit in said exposure chamber to sequentially rupture the engaged pods so that the first and second processing agents will thereby be sequentially exuded from the ruptured pods onto the exposed radiation-sensitive element between the radiation-sensitive element and the strippable cover sheet;

a resiliently urged pressure pad in said exposure chamber engageable with the strippable cover sheet of an exposed radiation-sensitive unit in said exposure chamber for pressurizing the exuded processing agent between the exposed radiation-sensitive element and the cover sheet so as to help spread the exuded processing agent across the radiation-sensitive element and force any excess processing agent back into its ruptured pod; and a resiliently mounted abutment in said exposure chamber spaced from said pressure pad so that a radiation-sensitive unit is receivable between said abutment and said pressure pad, said abutment being engageable with the mount of a radiation-sensitive unit so received to support the received radiation-sensitive unit against said pressure pad.

10. A device suitable for exposing and effecting the processing of a radiation-sensitive unit, each unit having a plane and including a radiation-sensitive element and a rupturable pod containing a processing agent exudable from the pod onto the element to process the element after the element has been exposed, said device comprising:
   a. means defining a position for storing an unexposed radiation-sensitive unit;
   b. means defining a position for exposing a radiation-sensitive unit;
   c. means for effecting movement of an unexposed unit from said storage position to said exposure position;
   d. means movable in a direction transverse to the plane of an exposed unit and engageable with the pod of a unit after the unit has been exposed for rupturing the engaged pod and thereby exuding the processing agent from the ruptured pod onto the exposed element; and
   e. means for moving said pod rupturing means transversely toward the pod to engage and rupture the pod.

11. A device as claimed in claim 10 wherein said pod rupturing means includes a piston movable toward and away from a position of engagement with the pod of an exposed unit.

12. A device suitable for exposing and processing a radiation-sensitive unit, each unit including a radiation-sensitive element and rupturable pod means containing processing agents exudable from the pod means onto the element to process the element after the element has been exposed, said device comprising:
   a. means defining a storage chamber for storing an unexposed radiation-sensitive unit therein;
   b. means defining an exposure chamber for exposing an radiation-sensitive unit received therein;
   c. means defining a passageway interconnecting said chamber for allowing movement of an unexposed unit through said passageway in a direction from said storage chamber to said exposure chamber;
   d. means reciprocatively movable in a direction transverse to the direction of movement of an unexposed unit through said passageway and engageable with the pod means of a unit after the unit has been exposed in said exposure chamber for rupturing the engaged pod means and thereby exuding the processing agents from the ruptured pod means onto the exposed element; and
   e. means for reciprocating said pod rupturing means into engagement with the pod means to rupture the pod means.

13. A device as claimed in claim 12 wherein said pod means includes first and second pods containing first and second processing agents, respectively, and said pod rupturing means includes first and second pistons movable sequentially toward and away from the first and second pods, respectively, of an exposed unit and engageable sequentially with the first and second pods, respectively, of an exposed unit to rupture the first and second pods sequentially and thereby exude the first and second processing agents sequentially onto the exposed element.

14. A camera as claimed in claim 13 wherein:
said exposing position is an exposure chamber;
said storing position is a storage chamber;
said means for effecting movement of an exposed unit comprises a passageway interconnecting said chambers; and
said pod rupturing means is adjacent said exposure chamber.